United States Patent [19]
Cavil

[11] 3,739,738
[45] June 19, 1973

[54] SAFETY CIRCUIT FOR ELECTRIC STEERING SYSTEM
[75] Inventor: David T. Cavil, Menomonee Falls, Wis.
[73] Assignee: Outboard Marine Corporation, Waukegan, Ill.
[22] Filed: Nov. 16, 1970
[21] Appl. No.: 89,605

[52] U.S. Cl............. 114/144 R, 180/79.1, 244/50, 318/588
[51] Int. Cl............................................ B63h 25/24
[58] Field of Search......................... 318/565, 588; 114/144 R; 180/79.1; 244/50–51; 317/DIG. 5, 31, 148.5; 340/30, 52 R, 53, 278

[56] References Cited
UNITED STATES PATENTS

| 2,869,063 | 1/1959 | Hess | 318/565 |
| 3,527,186 | 9/1970 | Wennberg | 114/144 |
| 3,140,436 | 7/1964 | Hatch | 318/588 |
| 3,454,851 | 7/1969 | Kirchhein | 318/565 |

Primary Examiner—Milton Buchler
Assistant Examiner—Stephen G. Kunin
Attorney—Robert E. Clemency, John W. Michael, Gerrit D. Foster, Bayard H. Michael, Paul R. Puerner, Joseph A. Gemignani, Andrew O. Riteris, Spencer B. Michael and Robert K. Gerling

[57] ABSTRACT

Disclosed herein is a control circuit for monitoring the steering system of a marine propulsion device, which control circuit includes a first position sensing potentiometer adapted to be connected to a source of electrical current and having a first wiper connected to a steering wheel to afford variation in the potential at the first wiper in accordance with the steering wheel setting, together with a second position sensing potentiometer adapted to be connected to a source of electrical current in common with the first potentiometer and including a second wiper connected to the swingable steering unit to afford variation in the potential at the second wiper in accordance with the position of the swingable steering unit, and switch apparatus adapted to be connected to a source of electrical current and to said wipers for generating an output when the difference in potential at the wipers exceeds a predetermined value. Such output can be employed to prevent operation of the marine propulsion engine ignition system or to otherwise alert the operator to the steering system malfunction evidenced by the difference in potential at the wipers above a predetermined value.

10 Claims, 1 Drawing Figure

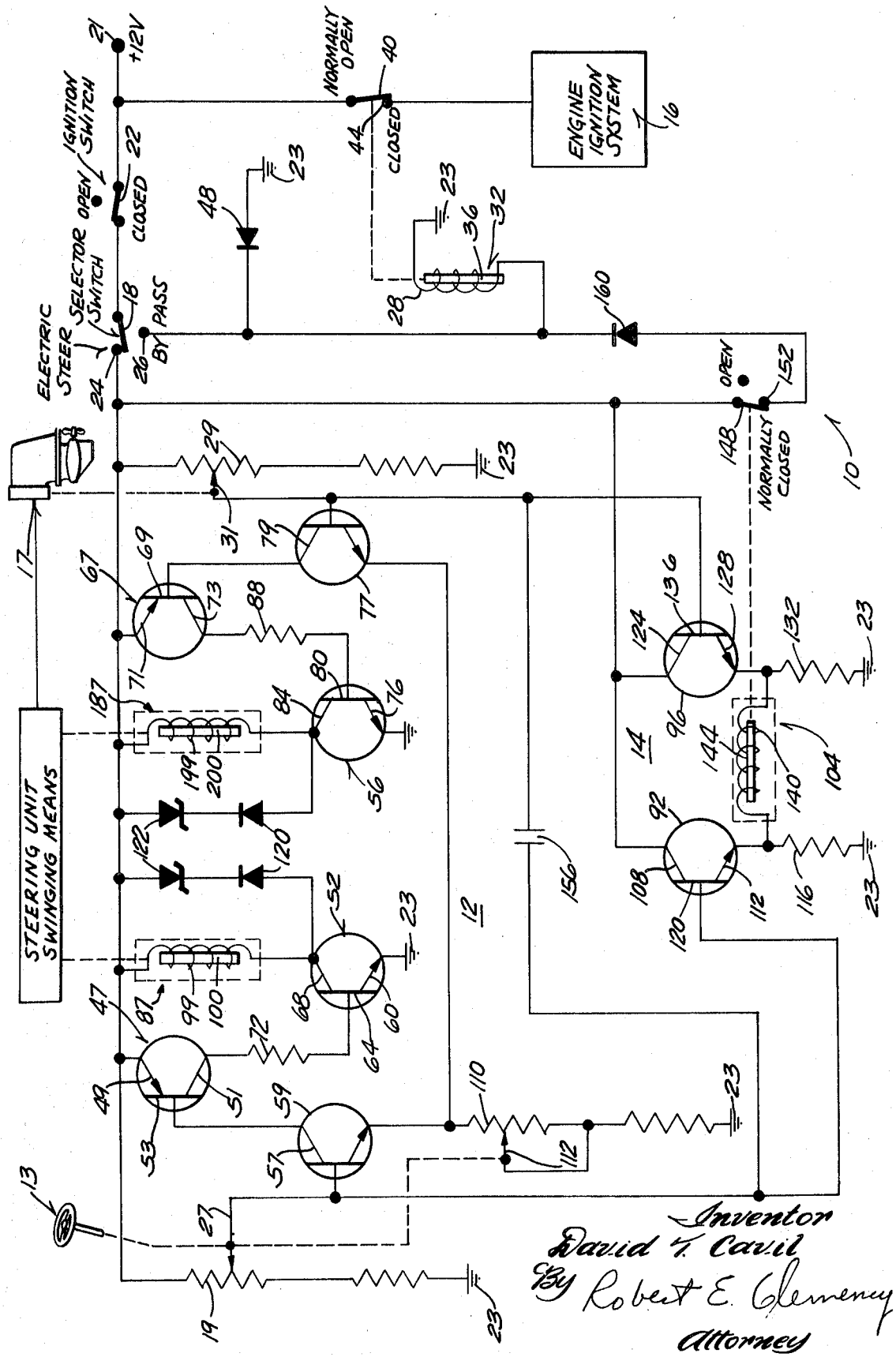

SAFETY CIRCUIT FOR ELECTRIC STEERING SYSTEM

RELATED APPLICATION

This application is related to U.S. Pat. No. 3,662,243, issued May 9, 1972, from Ser. No. 89,792, filed Nov. 16, 1970 and entitled "Electrical Circuit for Steering and Throttle Control of a Marine Propulsion Device."

BACKGROUND OF THE INVENTION

The invention particularly relates to marine propulsion devices and to steering arrangements therefor. Still more particularly, the invention relates to electrically operated steering systems. In addition, the invention relates to arrangements for signalling the operator in response to the occurrence of a malfunction in the steering system.

In part, the subject matter disclosed herein represents a further development of the subject matter disclosed in my U.S. Pat. No. 3,662,243, issued May 9, 1972.

SUMMARY OF THE INVENTION

The invention provides a circuit which, in response to malfunction of a steering system, provides an electrical output which can be utilized to notify the operator, as for instance, by ringing a bell or illuminating a light, or which can be utilized to prevent continued engine ignition operation. More particularly, the invention provides a circuit which is adapted to be integrated with an electrically operated feed-back steering system for providing steering action and with an engine ignition system so that in response to malfunction of the feed-back steering system, continued operation of the engine ignition system is prevented.

More particularly, the invention provides a steering monitoring circuit including a first position sensing potentiometer adapted to be connected to a source of electrical current and having a first wiper connected to a steering wheel to afford variation in the potential at the wiper in accordance with the setting of the steering wheel, together with a second position sensing potentiometer adapted to be connected to a source of electrical current common to the first potentiometer and including a second wiper connected to a swingable steering unit to afford variation in the potential at the second wiper in accordance with the position of the swingable steering unit. The monitoring circuit further includes means adapted to be connected to a source of electrical current and to the wipers for generating an electrical output when the difference in potential at the wiper exceeds a predetermined value, which output can be utilized to prevent engine ignition system operation or to otherwise notify the operator.

In accordance with the invention, the output generating means referred to in the preceding paragraph includes first and second transistorized switch means with the first transistorized switch means including a transistor having a collector adapted to be connected to a current source, a base connected to the first potentiometer wiper and an emitter. The second transistorized switch means includes another transistor having a collector adapted to be connected to a current source common with the collector of the first transistor, a base connected to the second potentiometer wiper and an emitter. The output generating means further includes respective connection of the emitters of the transistors to the opposite ends of a relay coil whereby there is provided an output in the relay coil when the difference in potential at the wipers exceeds a predetermined value. The output in the relay coil can be utilized to control the ignition system or to operate some device adapted to bring the operator's attention to the malfunctioning of the steering system which is evidenced by the excessive difference in potential at the wipers.

While the invention finds particular utility in connection with marine propulsion steering systems, in its broadest aspect, the invention is not so limited.

The principal object of the invention is the provision of a safety circuit for a marine propulsion electrically operated steering system, which safety circuit generates an electrical output adapted to be employed to notify the operator of malfunctioning of the steering system. A more particular object of the invention is the provision of such a safety circuit which is integrated with an engine ignition system to prevent ignition operation in the event of malfunction of the steering system.

Another principal object of the invention is the provision of an ignition and steering control and safety circuit for the steering system of a marine propulsion device including a selector switch which can be operated to by-pass the safety portion of the circuit so as to enable engine ignition operation, notwithstanding malfunctioning of the steering system.

Another principal object of the invention is the provision of a monitoring circuit between master and slave components, which circuit includes transistorized switch means for generating an output in the event of malfunctioning of the master-slave relation between the master and slave components.

Another of the objects of the invention is the provision of a transistorized safety circuit for an electrically operated steering control system, which safety circuit is economical to construct and maintain and will provide reliable service over a long and useful life.

Other objects and advantages of the invention will become known by reference to the following description and accompanying drawings.

DRAWINGS

FIG. 1 is a schematic wiring diagram of a combined ignition and feed-back steering control and safety circuit which is applicable to the steering unit and ignition system of a marine propulsion device.

GENERAL DESCRIPTION

Shown in the drawings is a combined ignition, steering control and safety circuit 10 for an internal combustion engine driven marine propulsion device having a steering unit 17 which is swingable about a generally vertical axis under normal operating conditions and which is controlled by a remote steering wheel 13. The ignition, steering control and safety circuit includes a steering control or feed-back circuit portion 12 which causes the steering unit 17 to follow steering actuation of the steering wheel 13 and a safety circuit portion 14 which is integrated with an engine ignition system 16 to permit normal engine ignition system operation in response to normal operation of the feed-back circuit portion 12 and to prevent engine ignition in the event of a failure in the operation of the feed-back circuit portion 12. In addition, the combined circuit 10 includes a select switch 18 which, in the event of failure in the steering control circuit portion 12 and consequent incapacity of the ignition system 16, permits bypass of the steering control circuit portion 12 and the safety circuit portion 14 to afford normal operation of the engine ignition system 16.

More particularly in accordance with the invention, the combined circuit 10 is provided with a source of electrical energy 21, such as a 12 volt battery, and includes an ignition switch 22 which can be a conventional manually operated key control switch, which is connected to the energy source 21, and which is operable between a closed position affording electrical operation of the steering control circuit portion 12 and the safety circuit portion 14, as well as normal operation of the ignition system 16, and an open position which prevents operation of the steering control circuit portion 12 and the safety circuit portion 14, and which also prevents operation of the engine ignition system 16.

Connected to the ignition switch 22 is the before mentioned select switch 18 which is manually operable between a first or electric steering position in engagement with an electric steering contact or terminal 24 to energize the steering control circuit portion 12 and the safety circuit portion 14, and a second or by-pass position in engagement with a by-pass contact or terminal 26 to cut off the feed-back and safety circuit portions 12 and 14, respectively, from the energy source 21, while simultaneously permitting normal operation of the engine ignition circuit 16. In this last regard, the by-pass terminal 26 of the selector switch 18 is electrically connected to one end of an ignition relay coil 28 of an ignition relay switch 32 having an armature 36 mechanically connected to a movable contact 40 which is connected to the energy source. The movable contact 40 is movable relative to a fixed contact 44 between an open position and a closed position electrically connecting the engine ignition system 16 to the energy source 21. Means (not shown) are provided in the ignition relay switch 32 for biasing the movable contact 40 away from the fixed contact 44 so that the ignition relay switch 32 is normally open. Connected to the by-pass terminal 26 and to said one end of the ignition relay coil 28 is a suppression diode 48 which, in turn, is connected to ground 23.

In operation, when the selector switch 18 is in the by-pass position and the ignition switch 22 is closed, the ignition relay coil 28 is energized to cause the movable contact 40 to be displaced from the normally open position to the closed position in engagement with the fixed contact 44 to thereby connect the engine ignition system 16 to the battery or other source of electrical energy 21.

In the event that the ignition system 16 is powered by a magneto, the ignition relay switch 32 can be interposed between the ignition system 16 and the magneto and would be operative to alternately connect the magneto to either the ignition system 16 or to a ground. In this circumstance, the ignition relay switch would be biased to normally connect the mageto to the ground and would require energization of the ignition relay coil 28 to connect the magneto to the ignition system 16.

The steering control circuit portion 12 is connected to the electric steering terminal 24 of the selector switch 18 and, except as will be explained, is generally identical to the circuit disclosed in my U.S. Pat. No. 3,662,243 which is incorporated herein by reference. In this regard, the components in this disclosure corresponding to the components disclosed in U.S. Pat. No. 3,662,243 have been given the same numerals.

The steering control circuit portion 12 shown in FIG. 1 and the circuit disclosed in U.S. Pat. No. 3,662,243 differ in that the collectors 51 and 73 of transistors 47 and 67 are connected through respective resistors 72 and 88 to respective additional transistors 52 and 56 which are respectively arranged to actuate the coils 99 and 199 of the relay switches 87 and 187 which control a steering unit swinging means including a reversible electrical motor. More specifically, the additional transistor 52 includes a base 64 which is connected to the resistor 72, an emitter 60 which is connected to ground 23 and a collector 68 which is connected to one end of the coil 87 which, in turn, is connected at its other end to the current source 21. Similarly, the additional transistor 56 includes a base 80 which is connected to the resistor 88, an emitter 76 which is connected to ground 23 and a collector 84 which is connected to one end of the coil 199 which, in turn, is connected at its other end to the current source 21.

Connected in parallel with the coils 99 and 199 between the source of current 21 and the collectors 68 and 84 of the additional transistors 52 and 56 are, as shown in FIG. 1, respective series connected diodes 120 and zener diodes 122. Except for providing greater sensitivity, the addition of the fifth and sixth transistors 52 and 56 and the slight rearrangement in the steering control circuit portion 12 has no effect on operation.

In accordance with the invention, the combined circuit 10 also includes the safety circuit portion 14 which includes a steering wheel position potentiometer 19 which is connected to the source of electrical current 21 and which has a wiper 27 connected to the steering wheel 13 so as to afford variation in the potential at the steering wheel wiper 27 in accordance with steering actuation of the steering wheel. In addition, the safety circuit portion 14 also includes a steering unit position potentiometer 29 which is connected to the source of electrical current 21 and which includes a wiper 31 connected to the swingable steering unit 17 to afford variation in the potential at the steering unit potentiometer wiper 31 in accordance with the position of the swingable steering unit.

Still further, the safety circuit portion 14 includes switch means adapted to be connected to the source of electrical current 21 and to the steering wheel potentiometer wiper 27 and the steering unit potentiometer wiper 31 and including means for generating an output when the difference in potential at the wipers 27 and 31 exceeds a predetermined limit.

Means are also provided for informing the operator when the difference in potential at the wipers 27 and 31 exceeds a predetermined limit or value. Various means can be employed. For instance, a bell ringing arrangement or a warning light illuminating arrangement could be employed. In the specifically disclosed construction, the operator informing means comprises an arrangement for discontinuing engine operation, which arrangement cooperates with the output generating means to prevent operation of the ignition system 16.

While other parameters can be employed, in the disclosed construction, the predetermined value of the potential difference between the wipers 27 and 31 is about 3 volts which represents about 22 degrees steering unit 17 travel. Thus, the safety circuit is actuated when the actual position of the steering unit is about 22 degrees from the intended position.

While various other arrangements can be employed, in the disclosed construction, the switch means which operates to prevent operation of the engine ignition system 16 includes the before mentioned ignition relay switch 32 connected between the engine ignition system 16 and the current source 21, as well as seventh and eighth transistors 92 and 96 which are respectively connected to the steering wheel potentiometer wiper 27 and the steering unit potentiometer wiper 31 and to the source of electrical current 21. If desired, the transistors 92 and 96 could be electrically connected to another source of electrical current.

More particularly, the seventh transistor 92 includes a collector 108 which is connected to the electric steering terminal 24 of the selector switch 18 (and thereby to the energy source 21), an emitter 112 which is connected through a resistor 116 to ground 23, and a base 120 which is connected to the steering wheel potentiometer wiper 27.

The eighth transistor 96 includes a collector 124 which is connected to the electric steering terminal 24 of the selector switch 18, an emitter 128 which is connected through a resistance 132 to ground 23, and a base 136 which is connected to the steering unit potentiometer wiper 31.

The operator informer means includes a safety relay switch 104 which includes a coil 140 connected to the emitters 112 and 128 of the respective transistors 92 and 96 and operative in response to current flow from the transistors 92 and 96.

In this last regard, the safety relay switch 104 connects the electric steering terminal 24 of the selector switch 18 to the ignition relay switch 32. More particularly, the safety relay switch 104 also includes an armature 144 and a movable contact 148 which is connected to the armature 144 and which is movable relative to a fixed terminal 152 between an open position and a closed position with the movable contact 148 in engagement with the contact 152 to connect the selector switch terminal 24 to the ignition relay coil 28. Means are also provided for normally biasing the safety relay switch 104 to the closed position. Accordingly, when selector switch 18 is in the electric steering position, the ignition relay switch 32 will be energized through the normally closed safety relay switch 104 to electrically connect the engine ignition system 16 to the battery 21. However, when the difference in potential between the steering wheel potentiometer wiper 27 and the steering unit potentiometer wiper 31 exceeds a predetermined value, current will flow through the safety relay coil 140 of the safety relay switch 104, causing the coil 140 to displace the safety relay switch 104 to the open position, thereby deenergizing the ignition relay coil 28 of the ignition relay switch 32 to disconnect the engine ignition system 16 from the battery 21, thereby discontinuing engine operation to inform the operator of the steering malfunction.

In order to stabilize the steering control circuit portion 12 and the safety circuit portion 14, by suppressing unwanted oscillation, a capacitor 156 is connected between the steering wheel potentiometer wiper 27 and the steering unit potentiometer wiper 31.

In order to prevent steering control into the feedback circuit portion 12 and the safety circuit portion 14 through the normally closed safety relay switch 104 when the selector switch 18 is in the by-pass position, there is provided, between the safety relay switch 104 and the ignition relay switch 32 a diode 160 preventing flow from the by-pass terminal 26 to the electric steering terminal 24.

While the potentiometers 19 and 29, as well as the transistors 52 and 56 and the transistors 47 and 67 and 92 and 96, as well as the engine ignition system 16 and the ignition relay switch 32 are all disclosed as being connected to the same energy source, one energy source can be employed for energizing the potentiometers 19 and 29, another energy source can be employed for energizing the transistors 52 and 56, another energy source can be employed for energizing the transistors 47 and 67, another energy source can be employed for energizing the transistors 92 and 96, another energy source can be employed for energizing the ignition system 16 and another energy source can be employed for energizing the ignition relay switch 32.

More particularly with respect to the operation of the safety circuit portion 12 of the invention, the emitter potentials of the transistors 92 and 96 will remain nearly the same so long as the steering control circuit portion 12 is operating correctly and the potentials of the wipers 27 and 31 are nearly the same. However, failure of the steering control circuit portion 12 which results in an unbalance of the potentials at the wipers 27 and 31 and a consequent unbalance at the emitters 112 and 128 can be detected by the safety circuit portion 14. When the unbalance at the wipers becomes large enough, i.e., about 3 volts in the disclosed construction, the sensitivity of the safety relay switch 104 is sufficient to cause movement of the armature 144 to open the normally closed safety relay switch 104, thus preventing continued operation of the engine ignition system 16 as already explained. Of course, the safety relay switch 104 could be employed to operate other devices which could bring the malfunctioning of the steering system to the attention of the operator. For instance, the relay switch 104 could operate to ring a bell or illuminate a light.

In the construction shown in FIG. 1, the following components can have the following identification or values:

| Component | Value or Identification |
| --- | --- |
| 52 | 2N3772 |
| 56 | 2N3772 |
| 92 | D28C5 |
| 96 | D28C5 |
| 116 | 150 ohms – 3 watts |
| 132 | 150 ohms – 3 watts |
| 48 | 50 volts – 1 amp |
| 160 | 50 volts – 1 amp |
| 156 | 50 volts – .15 micro-farads |
| 104 | Sigma 5F-10005 |
| 87 | Square D, Class 8501, Type K t D12 |
| 187 | Square D, Class 8501, Type K t D12 |

Various of the features of the invention are set forth in the following claims.

I claim:

1. A control circuit for a marine propulsion installation including a marine propulsion device having a steering unit swingable about a steering axis under normal operating conditions and a steering wheel remote from the steering unit, said control comprising a first potentiometer adapted to be connected to a source of electrical current and having a first wiper connected to the steering wheel and movable in response to steering wheel movement to afford variation in the potential at said first wiper in accordance with steering wheel setting, a second potentiometer adapted to be connected to a source of electrical current in common with said first potentiometer and including a second wiper connected to the swingable steering unit and movable in response to steering unit movement to afford variation in the potential at said second wiper in accordance with the position of the swingable steering unit, means adapted to be connected to a source of electrical current and to said wipers for generating a first output for swinging said steering unit in response to operation of said steering wheel, and means for informing an operator of the presence of a difference in potential at said wipers above a predetermined value including switch means for generating, when the difference in potential at said wipers exceeds the predetermined value, a second output for actuating said operator informing means, said switch means comprising a relay switch having a coil, a first transistor having a collector adapted to be connected to a source of electrical current, a base connected to said first potentiometer wiper, and an emitter connected to one end of said coil, a second transistor adapted to be connected to a source of electrical current in common with said collector of said first transistor, a base connected to said second potentiometer wiper, and an emitter connected to the other end of said coil.

2. A control circuit in accordance with claim 1 wherein said emitters are also connected to ground.

3. A control circuit in accordance with claim 1 wherein said relay switch includes a first terminal adapted to be connected to a source of electrical current, a second terminal adapted to be connected to an electrical device operable to alert the operator, a contact member moveable between a first position connecting said first and second terminals and a second position disconnecting said first and second terminals, means biasing said contact member to one of said positions, and an armature extending through said coil, connected to said contact member, and operable to displace said contact member to the other of said positions in response to energizing of said coil above a predetermined value.

4. A marine propulsion installation including an engine with an ignition system, a steering unit swingable about a generally upright axis under normal operating conditions, a steering wheel remote from the steering unit, and a control comprising a first potentiometer connected to a source of electrical current and having a first wiper connected to said steering wheel to afford variation in the potential at said first wiper in accordance with the setting of said steering wheel, a second potentiometer connected to a source of electrical current in common with said first potentiometer and including a second wiper connected to said swingable steering unit to afford variation in the potential at said second wiper in accordance with the position of said swingable steering unit, and switch means connected to a source of electrical current, to said wipers, and to said ignition system, and including means for generating an output operable, when the difference in potential at said wipers exceeds a predetermined value, for preventing operation of said ignition system.

5. A control circuit in accordance with claim 4 wherein said means for preventing engine ignition includes electrically operated switch means controlling continued engine ignition operation, first transistorized switch means adapted to be connected to a source of electrical current and to said first potentiometer wiper and to said electrically operated switch means, and second transistorized switch means adapted to be connected to a source of electrical current in common with said first transistorized switch means and to said second potentiometer wiper and to said electrically operated switch means.

6. A control circuit in accordance with claim 5 wherein said electrically operated switch means includes a relay coil, wherein said first transistorized switch means includes a first transistor having a collector adapted to be connected to the current source common to said first and second transistorized switch means, an emitter connected to one end of said relay coil, and a base connected to said first potentiometer wiper, and wherein said second transistorized switch means includes a second transistor having a collector adapted to be connected to the current source common to said first and second transistorized switch means, an emitter connected to the other end of said relay coil, and a base connected to said second potentiometer wiper.

7. A control circuit in accordance with claim 5 wherein said electrically operated switch means includes a first contact connected to one of said engine ignition system and a source of electrical current, a second contact connected to the other of said engine ignition system and the source of electrical current, said second contact being movable relative to a position in engagement with said first contact, a coil energized in response to operation of said first and second transistorized switch means, an armature associated with said coil and mechanically connected to said second contact, and means biasing said movable second contact away from said position in engagement with said first contact.

8. A steering and ignition control circuit for a marine propulsion device having an internal combustion engine with an ignition system and a steering unit swingable about a steering axis under normal operating conditions and adapted to be controlled by a remotely located steering wheel, said circuit comprising a first switch adapted to be connected to a source of electrical energy and movable between open and closed conditions, an engine ignition switch controlling electrical connection between the ignition system and a source of electrical energy, said ignition switch being biased to normally prevent engine ignition system operation, a selector switch connected to said first switch and including a movable contact selectively connectable with an electric steering contact and with a by-pass contact electrically connected to said engine ignition switch so that when said first switch is closed and said selector switch is positioned to connect said movable contact to said by-pass contact, said engine ignition switch is actuated to permit engine ignition system operation, a safety switch electrically connected between said engine ignition switch and said electric steering contact, said safety switch being biased to normally electrically connect said electric steering contact to said engine ignition switch and thereby to actuate said engine ignition switch to permit engine ignition operation when said first switch is closed and said selector switch is positioned with said movable contact is in engagement with said electric steering contact, and a safety circuit portion including means for actuating said safety switch in the absence of proper coordination between the steering wheel and the steering unit to thereby electrically disconnect said ignition switch from said electric steering contact and thereby to prevent engine ignition system operation when said first switch is closed and said movable contact of said selector switch is engaged with said electric steering contact.

9. A steering and ignition control circuit in accordance with claim 8 wherein said means for actuating said safety switch includes a first position sensing potentiometer adapted to be connected to a source of electrical current and having a first wiper connected to the steering wheel to afford variation in the potential at said first wiper in accordance with steering wheel setting, a second position sensing potentiometer adapted to be connected to a source of electrical current in common with said first potentiometer and including a second wiper connected to the swingable steering unit to afford variation in the potential at said second wiper in accordance with the position of the swingable steering unit, and switch means adapted to be connected to a source of electrical current and to said wipers and to said safety switch for actuating said safety switch when the difference in potential at said wipers exceeds a predetermined value.

10. A steering and ignition control circuit in accordance with claim 9 and further including means adapted to be connected to a source of electrical current and to said wipers and selectively operable for causing swinging of the steering unit in response to movement of the steering wheel.

* * * * *

UNITED STATES PATENT OFFICE
CERTIFICATE OF CORRECTION

Patent No. 3,739,738          Dated June 19, 1973

Inventor(s) David T. Cavil

It is certified that error appears in the above-identified patent and that said Letters Patent are hereby corrected as shown below:

Column 7, line 24, after "second transistor", insert

-- having a collector --.

Column 8, line 67, delete "is".

Signed and sealed this 21st day of May 1974.

(SEAL)
Attest:

EDWARD M.FLETCHER,JR.
Attesting Officer

C. MARSHALL DANN
Commissioner of Patents